US011586622B2

(12) United States Patent
Dwivedi et al.

(10) Patent No.: US 11,586,622 B2
(45) Date of Patent: Feb. 21, 2023

(54) TOKENIZATION OF DATABASE SEARCH TERMS

(71) Applicant: PayPal, Inc., San Jose, CA (US)

(72) Inventors: Vinay Dwivedi, Hyderabad (IN); Varun Reddy Putta, Hyderabad (IN)

(73) Assignee: PayPal, Inc., San Jose, CA (US)

( * ) Notice: Subject to any disclaimer, the term of this patent is extended or adjusted under 35 U.S.C. 154(b) by 42 days.

(21) Appl. No.: 17/370,803

(22) Filed: Jul. 8, 2021

(65) Prior Publication Data

US 2023/0010062 A1  Jan. 12, 2023

(51) Int. Cl.
*G06F 16/242* (2019.01)
*G06F 16/2453* (2019.01)
*G06F 16/248* (2019.01)
*G06F 16/28* (2019.01)

(52) U.S. Cl.
CPC ...... *G06F 16/24534* (2019.01); *G06F 16/243* (2019.01); *G06F 16/248* (2019.01); *G06F 16/287* (2019.01)

(58) Field of Classification Search
CPC .......... G06F 16/24534; G06F 16/243; G06F 16/248; G06F 16/287
See application file for complete search history.

(56) References Cited

U.S. PATENT DOCUMENTS

| | | | |
|---|---|---|---|
| 6,338,056 B1 | 1/2002 | Dessloch et al. | |
| 6,470,306 B1* | 10/2002 | Pringle | G06F 40/169 715/236 |
| 9,336,256 B2 | 5/2016 | Boukobza | |
| 11,403,286 B2* | 8/2022 | Bhutada | G06F 40/30 |
| 2006/0253438 A1 | 11/2006 | Ren et al. | |
| 2008/0104542 A1 | 5/2008 | Cohen et al. | |
| 2012/0158696 A1 | 6/2012 | Arasu et al. | |
| 2018/0060319 A1* | 3/2018 | Ko | G06F 16/313 |
| 2019/0129616 A1 | 5/2019 | Nguyen et al. | |
| 2022/0198581 A1* | 6/2022 | Rusu | G06F 40/284 |

OTHER PUBLICATIONS

International Search Report and Written Opinion in PCT Appl. No PCT/US2022/073448 dated Sep. 28, 2022, 8 pages.
Hadjieleftheriou et al., "Approximate String Processing," Foundations and Trends in Databases, vol. 2, No. 4, 2011, entire document.

* cited by examiner

*Primary Examiner* — Jorge A Casanova
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include preprocessing, by a computer system, records of a database to create one or more token sets for a given record. The created token sets may correspond to ones of a plurality of search string functions, and may include token sets that include a plurality of possible substrings located within data strings of a corresponding database record. The methods may further include receiving a query for a search of the database. The query may include at least one of the plurality of search string functions. The method may also include performing the search by traversing, using at least a portion of the records, at least one token set corresponding to the included search string functions, as well as returning results for the search based on the query and the traversing.

20 Claims, 12 Drawing Sheets

1000

Search Interface 701

Search Record 710 [ Transaction ▷ ]
Search Field 712 [ Address ▷ ]
Search Type 714 [ Contains ▷ ]
Search Term 716 [ Oregon ]
[ Begin Search 718 ]

Search Results 720

| Record ID 721 | Transaction ID 723 | Username 725 | Address 727 |
|---|---|---|---|
| Record 415 | ABC1234567890 | Jones789 | 123 Main Street, Ste 4, Springfield, *Oregon*, USA 97403 |
| Record 755 | QWE4309570943 | Jones789 | 123 Main Street, Ste 4, Springfield, *Oregon*, USA 97403 |
| Record 767 | VFR8930958987S | Smith927 | 1001 Oak Ave., Salem, *Oregon*, USA 97301 |
| Record 221 | ZZT81243877843 | Lee432 | 6512 High Street, Portland, *Oregon*, USA 97206 |

*Preprocessing, by a computer system, records of a database to create one or more token sets for a given record, wherein the created token sets correspond to ones of a plurality of string search functions, and include token sets that include a plurality of possible substrings located within data strings of a corresponding database record.*
810

*Receiving, by a computer system, a query for a search of the database, wherein the query includes at least one of the plurality of string search functions.*
820

*Performing the search by traversing, by the computer system using at least a portion of the records, at least one token set corresponding to the included search string functions.*
830

*Returning, by the computer system, results for the search based on the query and the traversing.*
840

```
┌─────────────────────────────────────────────────────────────────────┐
│ In response to determining that a new record, including a set of    │
│ data strings, has been added to a database, retrieving, by a        │
│ computer system, the new record from the database.                  │
│                              910                                    │
└─────────────────────────────────────────────────────────────────────┘
                                  │
                                  ▼
┌─────────────────────────────────────────────────────────────────────┐
│ Mapping, by a computer system, the new record to a respective one   │
│ of a set of record types.                                           │
│                              920                                    │
└─────────────────────────────────────────────────────────────────────┘
                                  │
                                  ▼
┌─────────────────────────────────────────────────────────────────────┐
│ Generating, by the computer system based on the record type, one or │
│ more substrings for ones of the set of data strings.                │
│                              930                                    │
└─────────────────────────────────────────────────────────────────────┘
                                  │
                                  ▼
┌─────────────────────────────────────────────────────────────────────┐
│ Storing, by the computer system, the generated substrings into one  │
│ or more token sets that correspond to ones of a plurality of search │
│ string functions.                                                   │
│                              940                                    │
└─────────────────────────────────────────────────────────────────────┘
```

```
Receiving, by a computer system, a query for a search of a database with a plurality of
records, wherein the query includes one or more of a plurality of string search functions.
                                      1010
```

```
Selecting, by the computer system based on the one or more search string functions, a
     subset of a plurality of token sets, wherein a given token set includes one or more
      substrings found within a data string included in a given record in the database.
                                      1020
```

```
Traversing, by the computer system using a search term included in the query, the
                              selected token sets.
                                      1030
```

```
Returning, by the computer system, results for the search based on the traversing.
                                      1040
```

*FIG. 10*

TOKENIZATION OF DATABASE SEARCH TERMS

BACKGROUND

Technical Field

This disclosure relates generally to computer system operation, and more particularly to searching techniques for a database.

Description of the Related Art

Databases may provide an efficient technique for storing large amounts of data that may then be referenced at a later point in time. In some cases, a user may want to search through the stored data to identify ones that include particular data values. The user may further request that search using a particular type of search function. For example, data in a given database may include records in which each record may contain one or more data strings corresponding to respective record fields. Various types of search functions may identify a particular data field in which to search and a particular search string to match. One type of search may include a "value equals" function in which all characters in a data string in the corresponding record field must match the search string in order to be a positive match. Another type of search may include a "begins with" function in which the first characters in a data string in the corresponding record field must match the search string, but additional characters may be present beyond the matching characters.

Depending on characteristics such as a number of records stored, a number of fields per record, and a type of search being performed, a given search query may take tens of seconds, or minutes to perform, and may consume a non-trivial amount of processing bandwidth associated with the database when performing the search. A search technique that is capable of reducing the amount of time and resources used to perform a search is desired.

BRIEF DESCRIPTION OF THE DRAWINGS

FIG. 7 illustrates two example views of a user interface associated with the search technique disclosed herein.

FIG. 8 shows a flow diagram of an embodiment of a method for managing a search function in the system of FIG. 1B.

FIG. 9 shows a flow diagram of an embodiment of a method for adding a new record using the disclosed search technique.

FIG. 10 shows a flow diagram of an embodiment of a method for performing a search of a data base using the disclosed search technique.

DETAILED DESCRIPTION

Records stored in a database should be discoverable in order to be helpful to users. Accordingly, database search engines are typically available for finding particular ones of multiple records stored in a given database. For some database operations, an adequate search engine may include an ability to search different fields in the stored records, an ability to perform different types of searches such as "begins-with" or "contains" a search string, execute without consuming an undesirable amount of bandwidth of the database. Other desirable features may include fast operation (e.g., a few seconds or less to display results), and offline features to provide an ability to identify records while the associated database is unavailable.

The present disclosure recognizes a desire for a technique for an efficient and fast method for searching a database. Techniques disclosed herein include preprocessing searchable records stored on a database to generate corresponding token sets. These generated token sets may be used for performing search queries, thereby reducing a need to access the records in the database. This reduction in accesses to the database may increase a bandwidth of the database for performing other tasks. In addition, the preprocessing may generate tokens that require less time to be compared to search strings than complete data strings of records. Such a process may, therefore, reduce an amount of time for performing a given search query. Furthermore, use of different token sets for different types of search functions may also reduce an amount of time needed for comparing search strings to tokens, by limiting the number of generated tokens to those that are applicable to the respective type of search function.

Disclosed embodiments include a system in which a computer system preprocesses a plurality of records of a database to generate a plurality of token sets, the token sets corresponding to a various types of string search functions. These token sets may include various substrings found within data strings that are included in the records. When a particular search query is received with a given type of search function, token sets that corresponding to the given search function may be selected. Tokens within selected token sets may be traversed, comparing the tokens with a search string in the query.

When the search techniques described herein are first implemented in a computer system, the computer system may require some amount of time to preprocess all searchable records in the database. After the search feature is installed, additional records may be stored to the database.

Figure 1A:
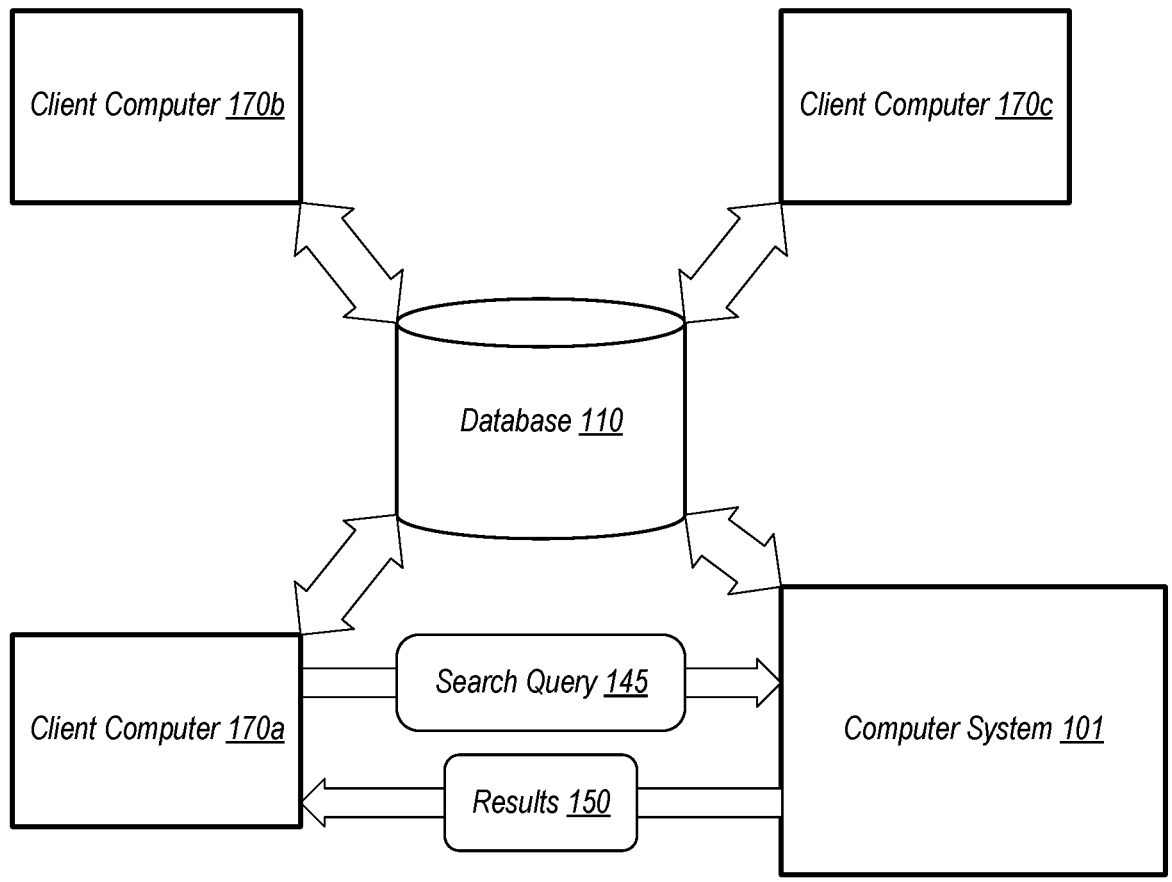
FIG. 1A is a block diagram illustrating an embodiment of a system for managing a search function for a database.
Figure 1B:
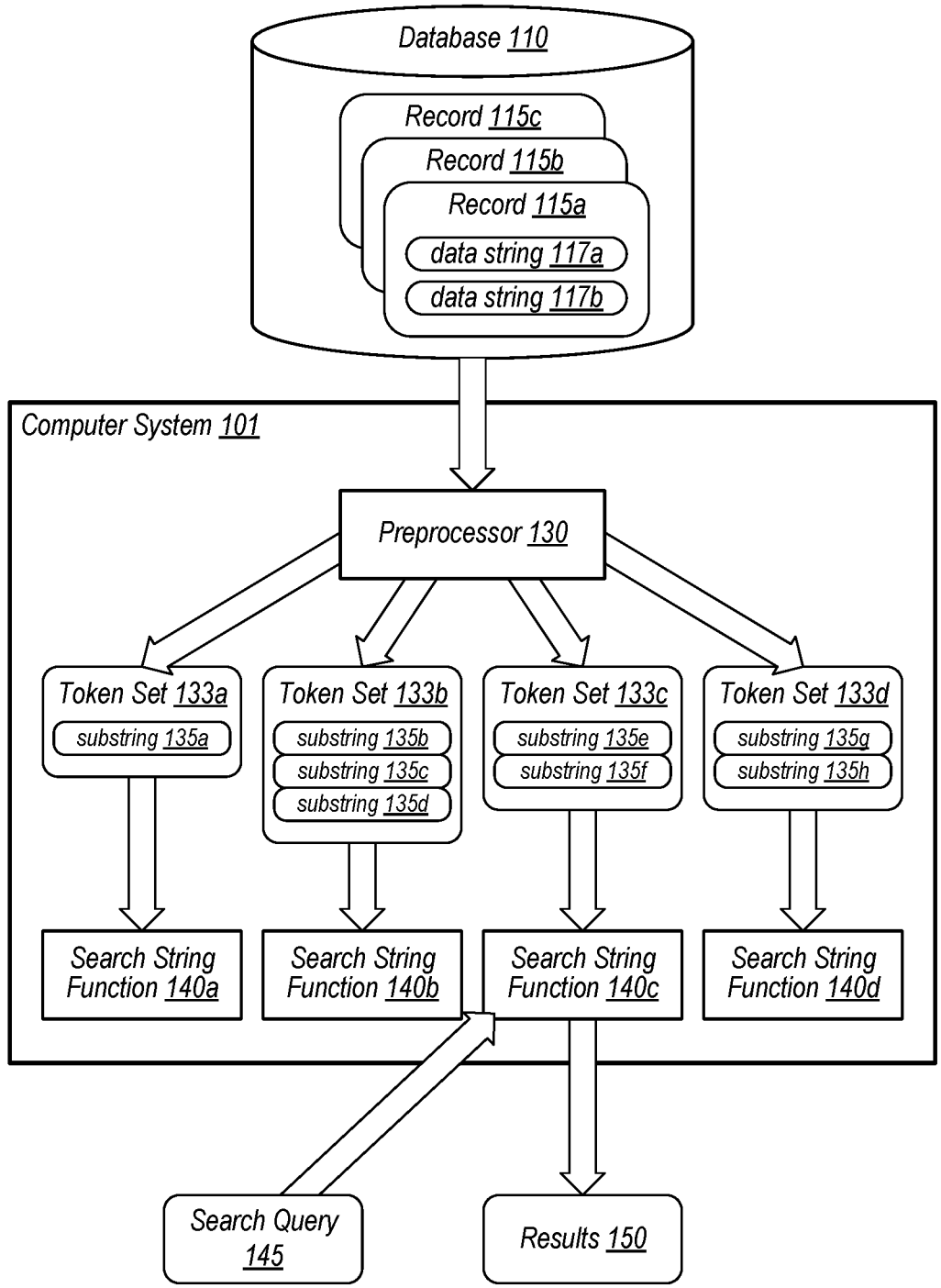
FIG. 1B is a block diagram illustrating an embodiment of a system capable of using tokens to perform a search of a database.

Two block diagrams of an embodiment of a system that may be used to implement the disclosed search techniques are illustrated in FIGS. 1A and 1B. System 100 includes database 110 which may be accessed by client computers 170*a*-170*c* (collectively client computers 170), as well as by computer system 101. Client computers 170 may further be capable of communicating with computer system 101.

As illustrated, computer system 101 may include, or be included in, a server computer system of an entity that provides a service to a plurality of users. Computer system 101 may be any suitable type of computer system, including an enterprise computer system, or a portion thereof. In various embodiments, computer system 101 may be a single computer system or a plurality of computer systems included, for example, in a server farm. In some embodiments, computer system 101 may be a subset of bandwidth of a server farm leased from a third party, e.g., a virtual computer.

Database 110, as depicted, includes memory circuits for storing various forms of information that may be used by computer system 101 and/or other computers coupled to database 110. Database 110 may include any suitable combination of volatile and/or non-volatile memory devices. Database 110 may further include, or be coupled to, processing systems that manage the storage of information as well as facilitate communication with other computers requesting access to the stored information. Database 110 may be used to store any suitable types of information including, for example, documents, media, transaction records, account profiles, and combinations thereof.

Client computers 170, as shown, may be utilized by users to access information on database 110, either directly, or indirectly through other computers (not shown) in system 100. Users may store records and retrieve stored records using respective ones of client computers 170. In a similar manner as computer system 101, client computers 170 may include any combination of computer systems, including desktops, laptops, tablet computers, smart devices, and the like. In some embodiments, some or all of client computers 170 may be included within computer system 101.

As shown, a user of client computer 170a issues search query 145 to perform a search of records stored in database 110. In the embodiment of FIG. 1A, computer system 101 is used to facilitate searches of database 110. Computer system 101 may be capable of performing faster searches than client computers 170 while using less bandwidth of database 110 to complete the searches. Computer system 101 receives search query 145, performs one or more search functions based on search query 145, and then returns results to client computer 170a. To perform the search functions in an efficient manner without burdening database 110 with additional record access requests, computer system 101 utilizes preprocessed tokens that include searchable substrings that may be found within data strings included in the records stored in database 110. Additional details of these preprocessed tokens are now presented in FIG. 1B.

In FIG. 1B, additional details for computer system 101 and database 110 are depicted. Database 110 may be used to store records 115a-115c (collectively records 115). Computer system 101 includes preprocessor 130 and search string functions 140a-140d (collectively search string functions 140). Preprocessor 130 may generate token sets 133a-133d (collectively token sets 133) which correspond to respective ones of search string functions 140.

Computer system 101 may preprocess, using preprocessor 130, records 115 of database 110 to create token sets 133 for record 115a. Token sets 133, as shown, correspond to ones of a plurality of search string functions 140. Token sets 133 may include a plurality of possible substrings 135 located within data strings 117 of record 115a. For example, preprocessor 130 may generate token sets 133 based on data string 117a of record 115a. In some embodiments, substring 135a may correspond to all characters of data string 117a, while substrings 135b-135h may correspond to various portions of the characters of data string 117a.

Search string functions 140 may correspond to respective ones of various types of search functions. For example, search string function 140a may be an "equals" function in which a search string matches all characters of a given data string. Search string function 140b may be a "starts-with" function in which the search string is matched to characters at the beginning of a given data string. In a similar manner, search string function 140c may be an "ends-with" function in which the search string is matched to characters at the end of a given data string. Likewise, search string function 140d may be a "contains" function in which the search string is matched to consecutive characters anywhere in a given data string. Accordingly, token set 133b includes substrings 135b-135d that correspond to various lengths of the first characters in data string 117a, and token set 133c includes substrings 135e-135f that correspond to various lengths of the last characters in data string 117a. In a like manner, token set 133d includes substrings 135g-135h that correspond to various lengths of consecutive characters anywhere within in data string 117a.

To perform a search, computer system 101 receives search query 145 for a search of database 110. Search query 145 includes at least one of the plurality of search string functions (search string function 140c, as shown), and also includes at least one search string. Search query 145 may be initiated by a user of computer system 101, either directly, or via networked connection, such as using a web-based interface over an internet connection. The user may have authorization to access all or a portion of records in database 110, and may use search query 145 to identify a particular record or set of records within the limits of authorization. In some cases, the search query may include a request for particular analytics of the records, such as a number of records that satisfy the search criteria, a largest or smallest record that matches the search criteria, or any other suitable datapoint(s).

As illustrated, computer system 101 performs search query 145 by traversing, using at least a portion of records 115, at least one token set (e.g., token set 133c) corresponding to the included search string function 140c. Based on search query 145 including a request for a type of search corresponding to search string function 140c, computer system 101 may select token set 133c as at least one token set to be traversed. In some embodiments, for every record (or a subset of all records) stored in database 110, there may be at least one token set that corresponds to a respective one of each of search string functions 140. To perform search query 145, computer system 101 may select a first corresponding token set and compare the search string from the query to at least one of the tokens from the first token set. Additional corresponding token sets, including token set 133c, may be searched in a similar manner, until the search criteria of search query 145 has been satisfied.

Computer system 101 may return results 150 for the search based on search query 145 and the traversing. If a match between the search string and a token of a given one of the searched token sets is determined, then information associated with the record that corresponds to the given token set may be returned to the requestor. For example, if the search string in search query 145 matches substring 135f of token set 133c, then information related to record 115a is returned. Returning this information may include sending the information from computer system 101 to a client computer from which search query 145 was received. The information may include any particular amount of information. In some embodiments, a record identification value may be the only piece of information returned. In other embodiments, all or a portion of the data strings in the matched record may be returned. The requestor, in some embodiments, may have an option to specify what portions of a matched record are returned.

By preprocessing records stored on the database to generate corresponding token sets, the generated token sets may be used for performing search queries, thereby reducing a need to access the records in the database. Reducing a number of accesses to the database may, in turn, increase a bandwidth of the database for performing other tasks. Furthermore, searching with tokens may require less time for comparisons to search strings as compared to making comparisons to complete data strings of records. A tokenization process may, therefore, reduce an amount of time for performing a given search query. In addition, use of different token sets for different types of search functions may also reduce an amount of time needed for comparing search strings to tokens, by limiting the number of generated tokens to those that are applicable to the respective type of search function.

It is noted that the embodiments of FIGS. 1A and 1B are merely examples. Features of the system have been simplified for clarity. In other embodiments, additional elements may be included, such as networking circuits to couple computer system 101 to database 110 and/or to a client computer that sends a search request. In various embodiments, preprocessor 130 and search string functions 140 may be implemented as software modules, as hardware circuits, or as a combination thereof.

As disclosed in FIG. 1B, a computer system is described as preprocessing records stored in a database to generate sets of tokens to be used for conducting search queries. When the search techniques described herein are first implemented in a given computer system, the given computer system may require some amount of time to preprocess all searchable records in the database. After the search feature is installed, additional records may be stored to the database. The following figure illustrates a technique for preprocessing new records after they are stored to a database.

Figure 2:
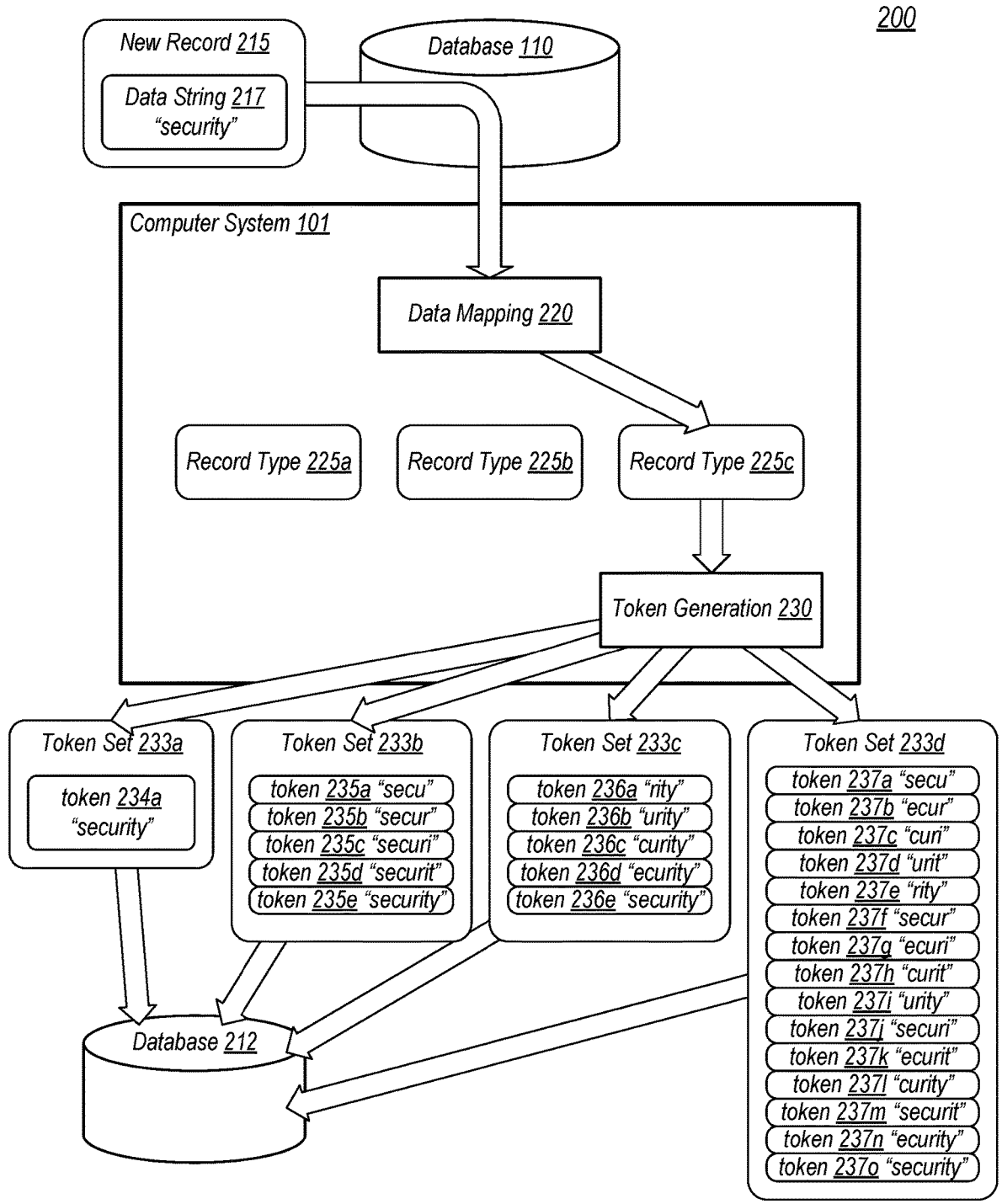
FIG. 2 shows a block diagram of an embodiment the system of FIG. 1B used to generate token sets for a new record added to the database.

Moving to FIG. 2, a block diagram of another embodiment of the computer system of FIG. 1B is illustrated. FIG. 2 describes how new token sets may be generated in response to a new record being added to a database. If search queries are performed using token sets, then the new record needs to have associated token sets to be included in a search. As records are added to the database of FIGS. 1A and 1B, corresponding token sets may be generated for the newly added record. System 200 includes computer system 101 and database 110 from FIG. 1B, as well as database 212. Computer system 101 includes two modules, data mapping 220 and token generation 230, that are used to process new record 215 that is stored in database 110, resulting in the generation of token sets 233a-233d (collectively token sets 233).

In response to determining that new record 215, including a set of data strings, has been added to database 110 that includes a plurality of records, computer system 101 may retrieve new record 215 from database 110. In order to preprocess records that may be included in a search query for database 110, computer system 101 may be configured to determine when new records are added to database 110, and then retrieve a copy of at least searchable portions of the new records. For example, searches may be test-based, and therefore, only searchable text included as part of the new records is retrieved.

As illustrated, computer system 101 uses data mapping 220 to map new record 215 to a respective one of a set of record types 225a-225c (collectively record types 225). Record types 225 may correspond to various categories of records that are stored in database 110. For example, records stored in database 110 may include user profiles (including for example, a particular user's name, contact information, account preferences, and the like), account update activity, an account login event, a transaction event, and so forth. After new record 215 is retrieved from database 110, data mapping 220 analyzes strings included in new record 215, including data string 217, which record type 225 is a best match for new record 215. For example, data mapping 220 may determine that strings in new record 215 include words or other values indicative of a login event, such as the word "security" in data string 217. According, data mapping 220 selects record type 225c, which may correspond to login events.

Based on the mapped record type 225c, computer system 101 uses token generation 230 to generate one or more substrings for ones of the set of data strings, including data string 217. The generated substrings may correspond to tokens included in one or more token sets associated with new record 215. Creating the plurality of possible substrings may include generating, by token generation 230, a first substring using a predetermined minimum number of consecutive characters located within data string 217, as well as generating a second substring using a predetermined maximum number of consecutive characters located within data string 217. In the illustrated example, a minimum of four characters per substring is used, although, in other embodiments, the minimum number may be larger or smaller. The maximum number of characters in the illustrated example is at least eight, although the actual maximum number may be larger. For example, the maximum number may be ten, in which case if data string 217 was "security passcode" rather than simply security, then the largest substrings would be limited to ten characters.

As shown, four token sets 233 are generated from data string 217. Token set 233a includes substrings that include the full data string 217 (at least up to the maximum number of characters). Accordingly, token 234a is the only substring generated for token set 233a. Token set 233b includes substrings associated with a "begins-with" search. To generate tokens for token set 233b, substrings are created from data string 217 by taking a consecutive number of characters starting with the first character. Token 235a includes the minimum number of characters, four, starting with the first character to generate the substring "secu." For the additional tokens in token set 233b, an additional character is added to each subsequent token 235b-235d, until data string 217 is included in its entirety in token 235e. Token set 233c is generated in a similar manner as token set 233b to support an "ends-with" search function. Token 236a is generated by taking the final four characters from data string 217 to form the substring "rity." A preceding character is added to each of tokens 236b-236d until the complete data string 217 is included in token 236e.

Token set 233d, as illustrated, is associated with a "contains" search function. Whereas the begins-with and ends-with search functions always include, respectively, the first or last characters of data string 217, token set 233d includes all consecutive substrings of at least the minimum length. Tokens 237a-237e are generated by taking four consecutive characters of data string 217, starting with "secu" and shifting over a character each time to generate "ecur," "curi," "urit," and "rity." To generate the remaining tokens 237f-237n, substrings of five, six, and seven characters are similarly generated, until the final token 237o is generated from the full eight characters of data string 217. Token generation 230 may repeat this process with additional data strings if data string 217 is not the only data string included in new record 215.

As shown, computer system 101 may store the generated substrings into one or more token sets 233 that correspond to ones of the plurality of search string functions. In the example of FIG. 2, records comprising database 110 are located in a first storage device, while the created token sets are stored in a second database 212 on a second storage device different from the first storage device. By storing the searchable token sets 233 separate from database 110, a search a received search query that includes one of the plurality of search string functions, may be performed by searching at least a portion of the plurality of records, using a particular one of the one or more token sets 233, the particular token set corresponding to the included search string function. For example, a start-with search may be performed using token set 233*b* without having to access either database 110 or token sets 233*a*, 233*c*, and 233*d*. Computer system 101 may return results for the search based on the search query.

It is noted that data mapping 220 and token generation 230 may be included as respective portions of preprocessor 130 in FIG. 1B. In various embodiments, data mapping 220 and token generation 230 may be implemented as software, hardware, or a combination thereof. For example, computer system 101 may include (or have access to) a non-transitory, computer-readable medium having program instructions stored thereon that are executable by the computer system to cause the operations described in regards to data mapping 220 and token generation 230. Only elements used to describe the disclosed concepts are illustrated. In other embodiments, additional elements may be included. For example, three record types and four token sets are shown. In other embodiments, any suitable number of record types and token sets may be included. Additional details of performing a search query are now presented in FIG. 3.

Figure 3:
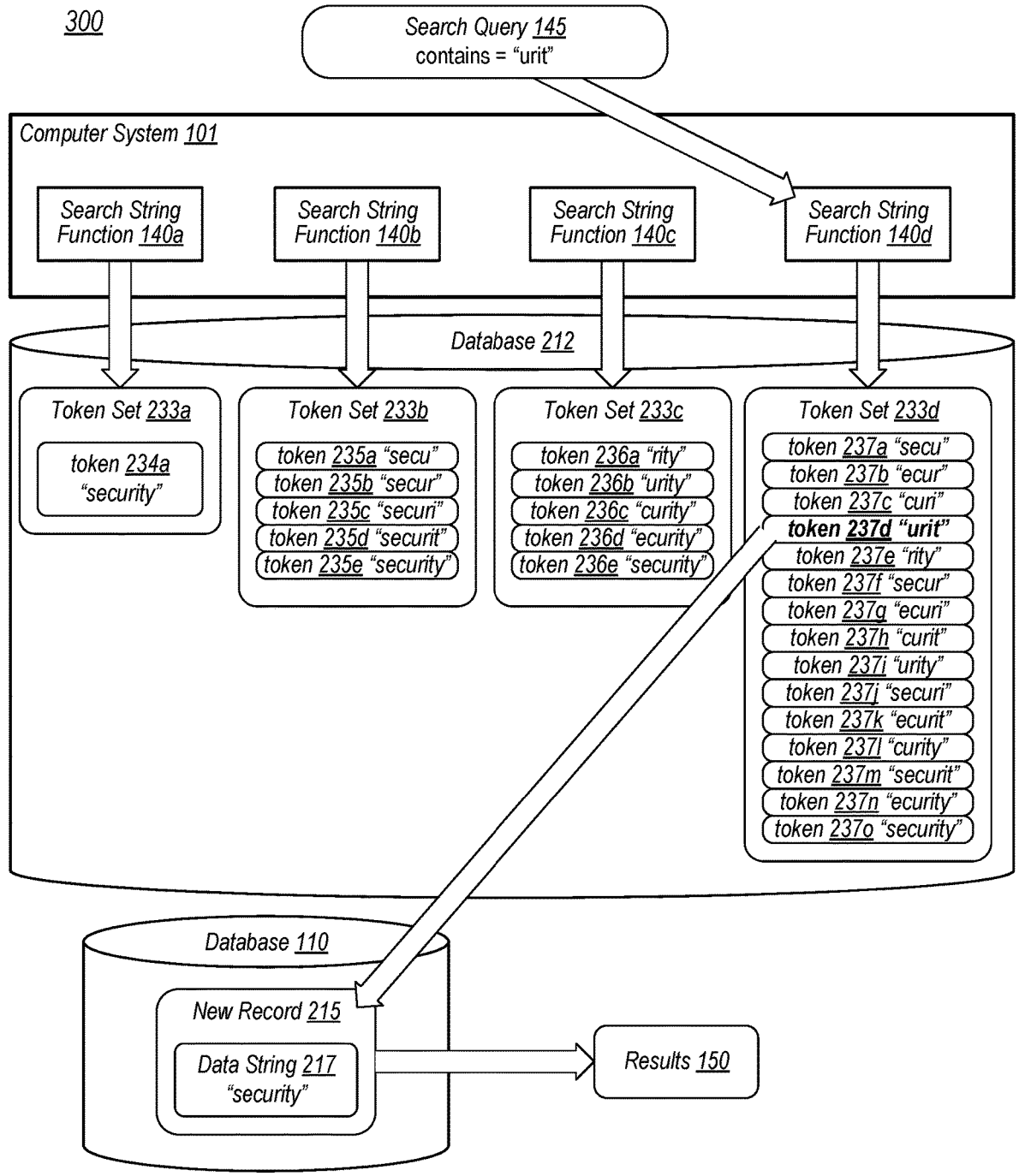
FIG. 3 depicts a block diagram of an embodiment the system of FIG. 1B using tokens to perform a search of records in the database.

FIG. 3 illustrates a block diagram of an embodiment of the computer system of FIGS. 1A, 1B, and 2 being used to perform a search query. Techniques for the creation of token sets are described above. System 300 of FIG. 3 depicts how the disclosed computer system may utilize these token sets to perform a search of a database. System 300 includes computer system 101 and database 110 from FIG. 1B, as well as database 212 from FIG. 2. Computer system 101 includes four modules from FIG. 1B, search string functions 140, that are used to perform search query 145 to produce results 150.

Computer system 101 receives search query 145 for a search of database 110 that has a plurality of records, including new record 215. In some embodiments, search query 145 may include one or more of a plurality of search string functions 140. Search query 145 includes a request to perform a "contains" search to identify records of database 110 that contain the search term "urit" as shown. The "contains" search corresponds to search string function 140*d*.

As illustrated, new record 215 has a plurality of token sets 233 that correspond to the included data string 217. In some embodiments, new record 215 may include additional data strings having respective token sets. As disclosed in regards to FIG. 2, these token sets are generated in response to new record 215 being added to database 110. Search query 145 may be received at any point in time after token sets 233 are generated. Ones of token sets 233 correspond to respective ones of search string functions 140. Computer system 101 selects, based on the included "contains" search string function, one or more token sets, including token set 233*d* which includes fifteen substrings found within a data string included in new record 215 in database 110. For example, database 110 may have 1000 records, at least a portion of these records including one or more data strings, and at least a portion of these data strings having a respective plurality of token sets. Computer system 101 may select a subset of the token sets that correspond to search string function 140*d*.

Computer system 101, as shown, traverses, using the search term "urit" included in search query 145, the subset of token sets, including token set 233*d*. The traversing includes comparing the search term to one or more of the substrings in the subset of token sets. For example, computer system 101 may compare the search term "urit" to one or more of tokens 237 in token set 233*d*. Since the search term "urit" includes four characters, tokens of token set 233*d* that include five or more characters may be skipped, limiting the traversing to tokens 237*a*-237*e*. Once token 237*d* is matched to the search term, computer system may cease comparisons to token set 233*d*, thereby skipping a comparison of the search term to token 237*e*. Computer system 101 may continue to traverse other ones of the selected subset of token sets, to identify other records that satisfy the search criteria.

In response to the search term matching token 237*d*, computer system 101 may add the corresponding record of the plurality of records (e.g., new record 215) to results 150. In various embodiments, results 150 may include only an identifier of new record 215, such as a record number, database index, memory address, or any other suitable value that enables computer system 101 to identify new record 215 within database 110. In other embodiments, results 150 may include one or more data strings from new record 215, such as a record name and/or type, as well as the data string that matched the search term. Computer system 101 returns results 150 for search query 145 based on the traversing. This returning may include accessing, from database 110, records that were added to results 150. In some embodiments, records of the plurality of records that were not added to results 150 are not accessed in response to search query 145. In such embodiments, only the token sets, and not the records themselves, are accessed when the search is performed. After records included in the results have been accessed, at least a portion of data strings included in the accessed records are presented on a display of a computer. In various embodiments, this computer may correspond to computer system 101 or to a different computer from which search query 145 was initiated and/or sent.

It is noted that database 110 may be located in a first storage device, while the plurality of token sets, such as token sets 233, may be located on a second storage device different from the first storage device. Such a separation of the token sets used for the search operations from the database may allow for various searches to be performed with little to no use of the database's bandwidth. The database may be accessed on the first storage device for storing and retrieving records while searches are performed on the token sets stored on the second storage device.

It is noted that FIG. 3 is an example of a computer system performing a search query. FIG. 3 includes only elements for describing the disclosed concepts. Additional elements may be included in other embodiments. For clarity, only new record 215 is depicted in database 110, and only token sets associated with new record 215 are shown in database 212. In other embodiments, it is contemplated that multiple records will be included in database 110 and that a plurality of different token sets, associated with various ones of the multiple records, will be included in database 212.

FIGS. 1-3 describe various embodiments of a computer system for managing searches of a database. Multiple operations may be employed during the management of such search functions. For example, operations associated with mapping records to particular record types and filtering characters included in the records are disclosed next.

Figure 4:
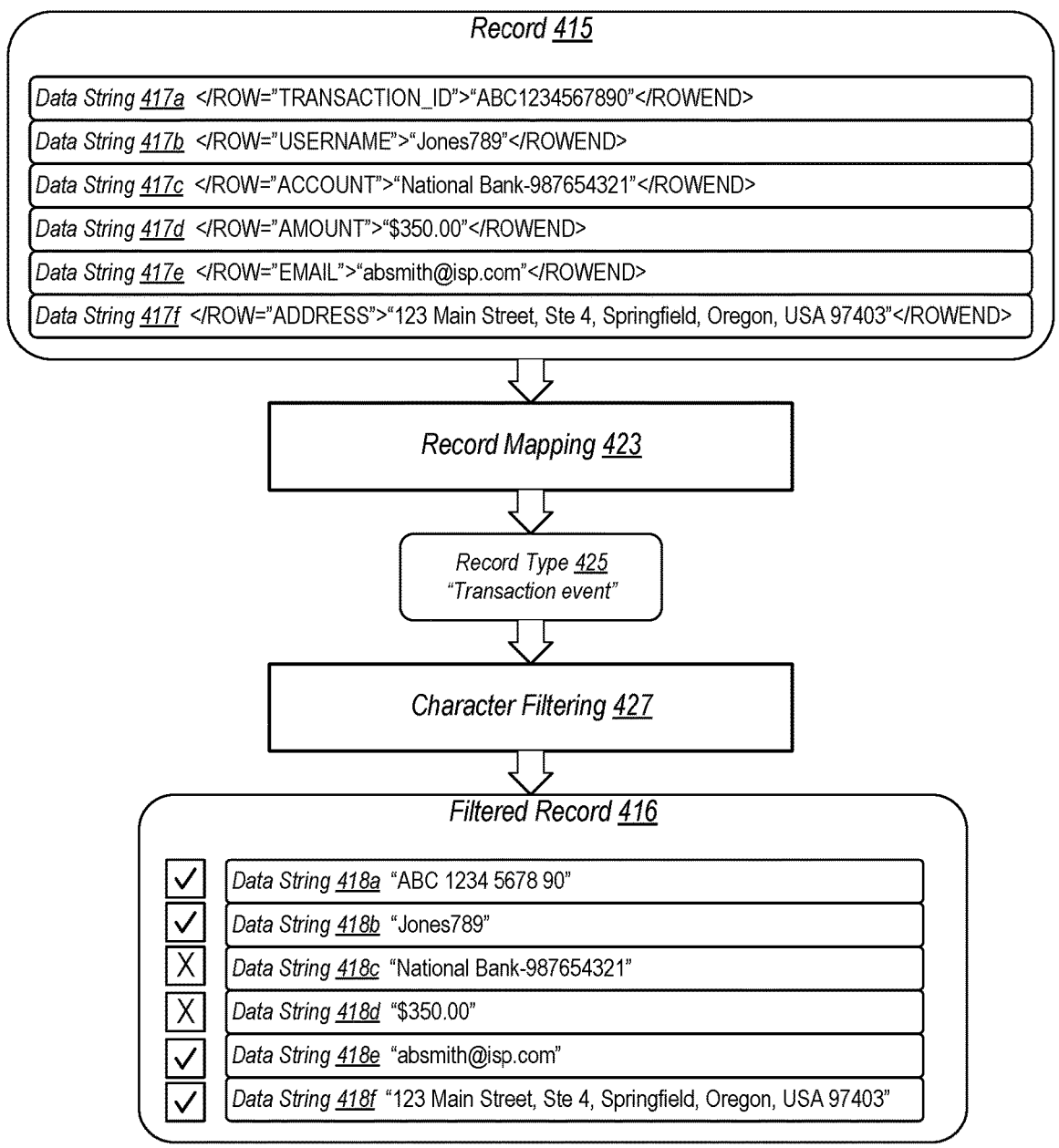
FIG. 4 illustrates an example of mapping a record to a particular one of a set of record types, and performing a filtering of data strings of the record.

Proceeding to FIG. 4, an example of a record being mapped to a particular record type and data strings of the record being filtered is illustrated. Example 400 depicts how a given record that is stored in database 110 may be mapped to a particular record type. In addition to this mapping, example 400 includes filtering operation to remove characters that may be superfluous to a search operation (e.g., control tags). Example 400 includes a record to be processed, record 415, further including data strings 417a-417f (collectively data strings 417). As part of this processing, record 415 is mapped (423) and filtered (427) to generate filtered record 416. The example of FIG. 4 may be performed by computer system 101 in FIGS. 1-3.

As illustrated, record 415 is included in a searchable database such as database 110 in FIGS. 1-3. Record 415 may be recently added to database 110, similar to new record 215 in FIG. 2, or may already be stored in database 110 when a computer system performs a preprocessing operation on the database. The six data strings 417 that are included in record 415 may each be associated with a respective field in record 415, each field corresponding to a particular row in the record. For example, data string 417a includes control tags that indicate a beginning and an end of a row corresponding to a field labeled "TRANSACTION_ID" with a data string of the field assigned the value "ABC1234567890." In a like manner, data strings 417b-417f define string values for fields labeled "USERNAME," "ACCOUNT," "AMOUNT," "EMAIL," and "ADDRESS." The control tags in this example are indicated by the "<" and ">" characters.

As a first operation to preprocess record 415, computer system 101 may utilize record mapping 423 to assign record 415 to one of a set of record types, such as record types 225 in FIG. 2. Record mapping 423 may analyze the fields and/or string values assigned to one or more of data strings 417 to select a particular record type for record 415. In the illustrated example, record mapping 423, based on fields such as "TRANSACTION ID" and/or "AMOUNT," may determine that data strings 417 correspond to record type 425 which is a "transaction event" such as a payment or purchase.

After selecting record type 425 for record 415 and prior to creating one or more token sets for data strings 417, computer system 101 filters the control tags from data strings 417 in record 415. Computer system 101 utilizes character filtering 427 to filter data strings 417, including removing the control tags. Character filtering 427 may detect the control tag start character "<" and then remove all characters up to and including the control tag end character ">." As shown in filtered record 416, data strings 418a-418f have been stripped of the control tags, leaving the string values.

It is noted that filtered record 416 does not replace record 415 in database 110. In some embodiments, filtered record 416 may only be retained in a local, volatile memory of computer system 101 for a duration of the preprocessing operation. After a corresponding plurality of token sets have been generated for record 415, filtered record 416 may be discarded.

The generating of token sets for record 415 may include, based on the mapping, excluding substrings for one or more of data strings 418 from the token sets. For example, data strings 418c and 418d are shown with an "X" in corresponding boxes next to each data string, while the other data strings (418a, 418b, 418e, and 418f) are shown with the check marks in these boxes. In this example, a check indicates that the associated data string 418 is to be used for generation of a respective set of tokens, while the "X" indicates that no token sets should be generated for that data string 418. Whether a check or an X is placed next to a given data string may be determined, at least in part, by the mapped record type. When record type 425 is selected, character filtering 427 may know to exclude account and amount data strings from the token generation. For example, a file containing a set of one or more rules for the generation of token sets may be accessible by computer system 101. Such a set of rules may include indications for one or more of the record types, specifying which types of data strings to include and which to exclude. Accordingly, a system administrator or other person with access to computer system 101 may be capable of defining which data strings are included and which are excluded from the subsequent token generation operation.

It is noted that the example of FIG. 4 is presented to demonstrate disclosed concepts. The disclosed example is not intended to be limiting, and examples of other embodiments may include different elements. For example, example 400 illustrates one example of a transaction type of record with six data strings. In other embodiments, any suitable number of data strings may be included. Although data strings 418c and 418d were shown as excluded from token set generation, in other embodiments, either data string, or both, may be included, and other data strings may be excluded. In various embodiments, each of record mapping 423 and character filtering 427 may be implemented as software modules, as hardware circuits, or as a combination thereof.

FIGS. 4 describes an embodiment of mapping and filtering operations to generate a filtered record. This filtered record may be used in a subsequent operation to generate one or more sets of tokens.

Figure 5:
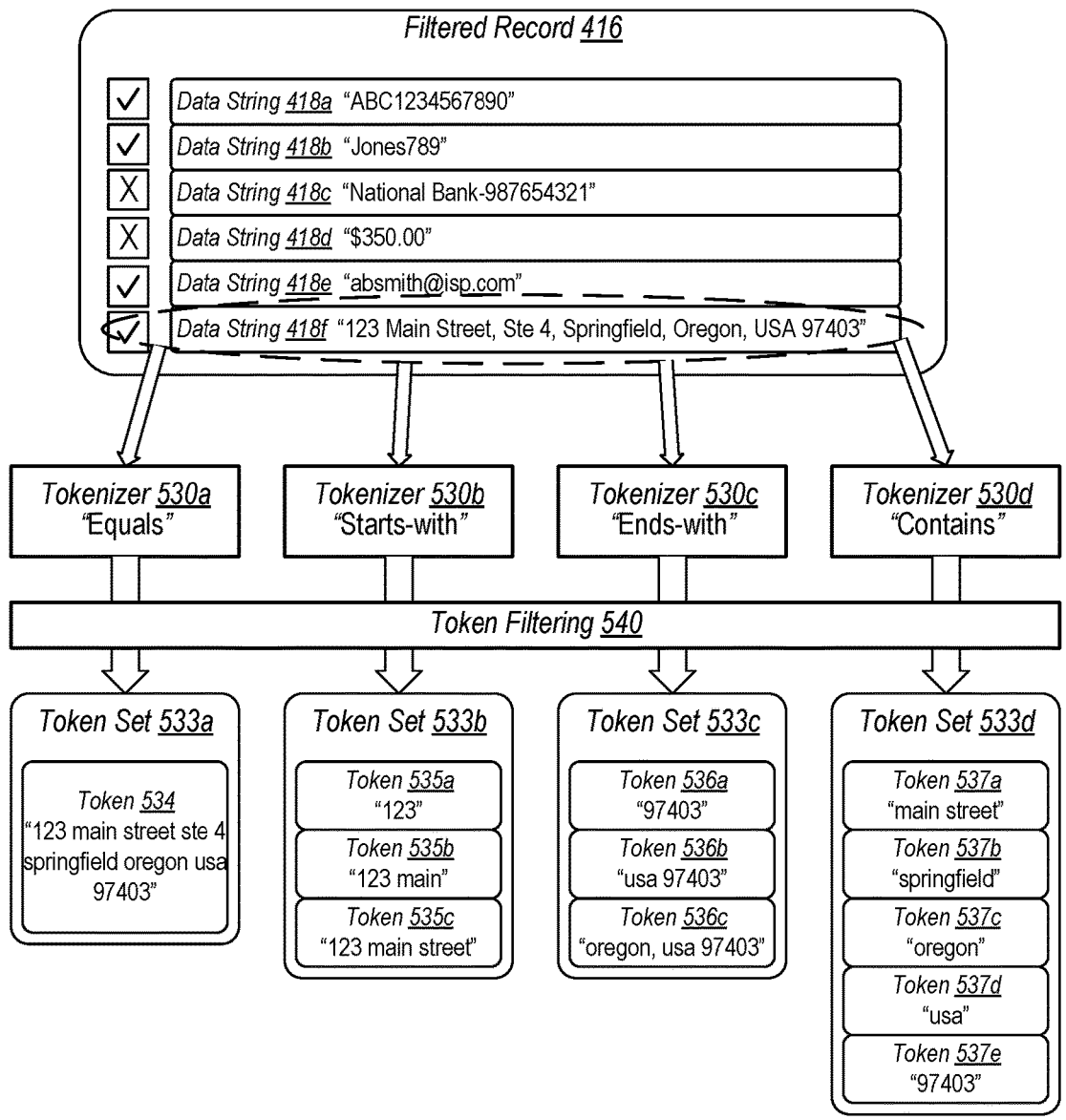
FIG. 5 shows an example of generating token sets for a field of a filtered record.

Moving now to FIG. 5, an example of a filtered record being "tokenized" to generate a plurality of token sets is illustrated. Example 500 includes filtered record 416, from FIG. 4, that further includes data strings 418a-418f (collectively data strings 418). Tokenizers 530a-530d (collectively 530) may be used to generate token sets 533a-533d (collectively 533) from data strings 418 in filtered record 416. The example of FIG. 4 may be performed by computer system 101 in FIGS. 1-3.

After filtered record 416 has been generated, such as in accordance with the operations described in FIG. 4, filtered record 416 may be "tokenized," e.g., processed by each of tokenizers 530 to generate a respective token set for each of the indicated data strings 418. As described above, data strings 418 of filtered record 416 are assigned an indication of whether the respective data string is to be included in the tokenization. Based on the respective indication for a given data string 418 of filtered record 416, a substring of the given data string 418 is excluded from the token sets. As shown, data strings 418c and 418d are excluded from the tokenization while the remaining data strings 418 are included.

As illustrated, each of tokenizers 530 corresponds to a particular one search string function (e.g., search string functions 140 in FIG. 1B). Tokenizer 530a is used to generate token set 533a that corresponds to an "equals" search string function in which the search string must match an entirety of a respective data string to satisfy the search criteria. As shown, tokenizer 530a generates token set 533a using data string 418f, resulting in the single token 534 that has a value equal to all characters of data string 418f.

Tokenizer 530b, as depicted, is used to generate token set 533b that corresponds to a "starts-with" search string function. To satisfy a "starts-with" search string function, characters at the beginning of a respective data string must match the search string included in a given search query. Token set 533b is depicted as including tokens 535a-535c. It is noted that in token set 533b, rather than each token 535 including one additional character than a previous token, tokens 535 each include a respective portion of a street address included in data string 418f. Token 535a has a value of "123," token 535b has a value of "123 main," and token 535c has a value of "123 main street." Since data string 418f corresponds to a mailing and/or physical address of, e.g., a residence, a business, or other entity, an assumption may be made that a search of address data strings will include a full street number and at least a full word of the corresponding street name, city, state, country, postal code, and any other portion of a given address. Such an assumption may be implemented as a respective rule of the set of rules described above. Accordingly, a system administrator or other entity with authority over the search operations may determine how an address and/or other fields in a record may be parsed during the tokenization.

Tokenizer 530c, in a similar manner, may correspond to an "ends-with" search string function that matches characters at the end of a data string to the search string. Accordingly, token set 533c includes tokens 536a with a value of "97403," token 536b with a value of "usa 97403," and token 536c with a value of "oregon, usa 97403." As previously described, tokens may still be generated based on maximum and minimum character lengths. However, a given rule may modify such a restriction, such as in the present example in which portions of a particular data string are selected to represent whole terms or values. Token 535a may, therefore, have only three characters instead of a minimum of four characters, while tokens 535c and 536c may have more than a maximum of ten characters, for example.

As illustrated, tokenizer 530d may correspond to a "contains" search string function that matches a sequence of characters anywhere within a data string to the search string. Due to the described rules associated with address data strings, token set 533d may include five tokens, each representing a different portion of the address. Token 537a includes a street name, token 537b includes a city, token 537c includes a state, token 537d includes a country, and token 537e includes a postal code. In contrast to token sets 533a-533c, the set of rules in the current example may exclude generating a token with a street number for token set 533d. In some embodiments, the set of rules may further exclude combinations of city, states, countries, and the like. Such a set of rules may be used to establish any suitable inclusions and/or exclusions of tokens as desired by an entity managing the search operations.

As shown, the tokenization further includes, after creating a given token of a particular token set of a particular record, performing token filtering 540 by converting uppercase characters to lowercase characters in the given token. For example, token 535c is generated from the characters "123 Main Street" in data string 418f. The capital letters "M" and "S" are converted into their respective lower case letters "m" and "s." Elimination of capitalization may result in fewer tokens needing to be created while eliminating a concern for a search requestor to include capitalization in a provided search string.

It is noted that example 500 merely demonstrates the disclosed techniques, and is not intended to be limiting. In various embodiments, each of tokenizers 530 and token filtering 540 may be implemented as software modules, hardware circuits, or a combination thereof. Although example 500 illustrates only data string 418f being tokenized, the other data strings 418, per the respective indications, may also be tokenized to create additional token sets. Such an embodiment is now described.

Figure 6:
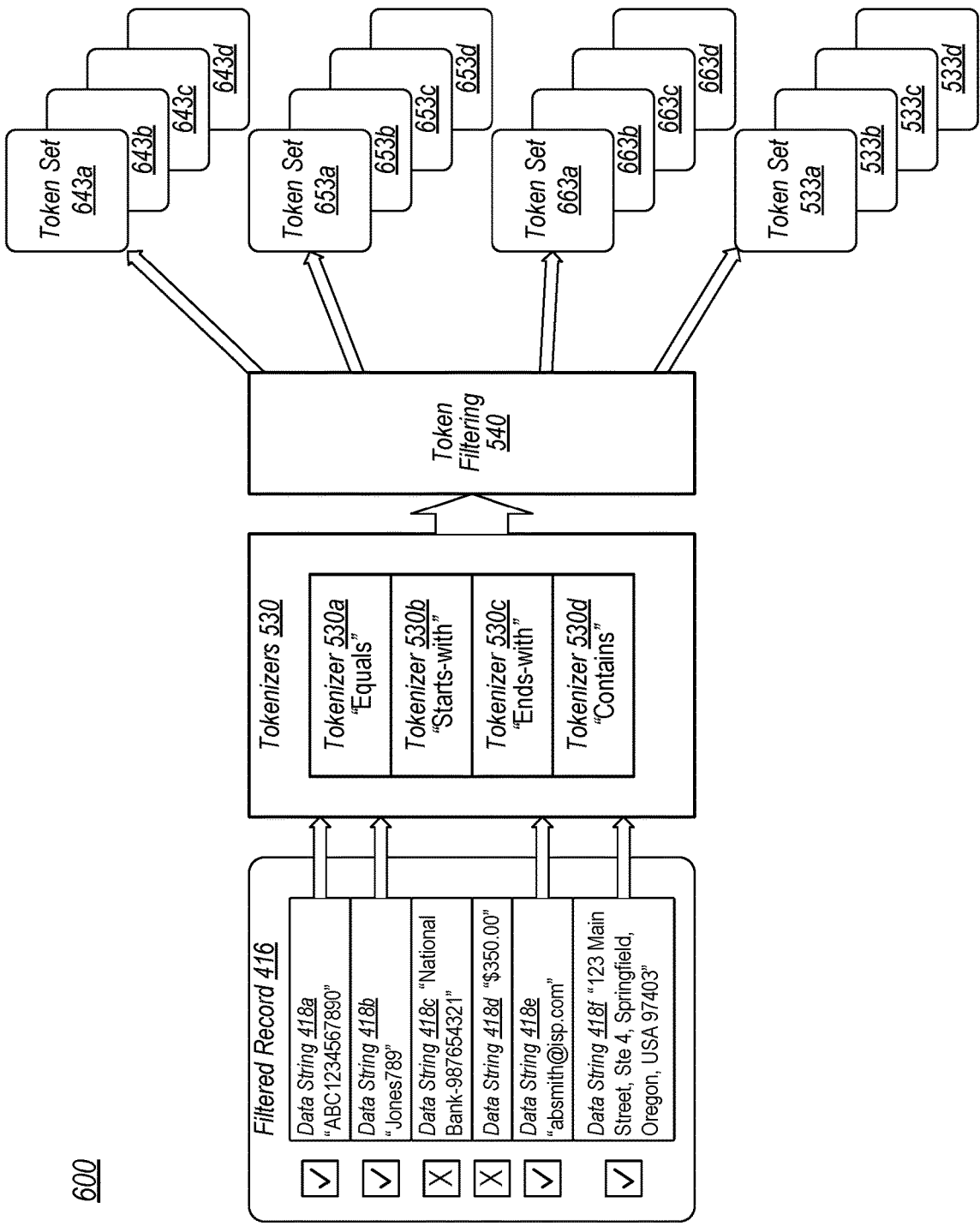
FIG. 6 depicts a block diagram of an embodiment the system of FIG. 1B being used to generate a plurality of token sets for multiple fields of a filtered record.

Turning now to FIG. 6, an example of multiple data strings in a filtered record being "tokenized" to generate a plurality of token sets is depicted. Example 500 illustrated one data string being tokenized. In example 600, filtered record 416 includes six data strings 418, in which each data string 418 includes an indication of whether the respective data string is to be tokenized using tokenizers 530 and token filtering 540 to generate multiple pluralities of token sets 533, 643, 653, and 663.

As illustrated, filtered record 416 from FIGS. 4 and 5 is shown with six data strings 418. Data strings 418c and 418d include respective indications (boxes marked "X") that they are not to be tokenized. The remaining four data strings are received by tokenizers 530 to generate respective pluralities of token sets. The tokenization may be performed as described above in regards to FIGS. 2 and 5. As described above, one or more rules may be in place for tokenizers 530 when generating respective tokens. These rules may be applied to particular types of data strings (e.g., a physical/mailing address) and/or to a particular record type. For example, a first rule for "transaction events" such as filtered record 416 may establish that data strings that include account information and amounts are not tokenized. A second rule may establish that data strings that include street address information are parsed for tokens using complete names and numbers rather than incremental tokens as shown in FIG. 2.

Tokenizers 530 generate respective token sets for each of the identified data strings 418. For example, tokenizer 530a may generate token sets 643a, 653a, 663a, and 533a respectively, for data strings 418a, 418b, 418e, and 418f. Similarly, tokenizer 530c may generate token sets 643c, 653c, 663c, and 533c respectively, for data strings 418a, 418b, 418e, and 418f. It is noted that, any given token set may be a null set. For example, a particular rule may establish that tokenizer 530a does not generate tokens for a particular type of data string, even when the data string is included in the tokenization.

Token filtering 540, as previously described, may filter the generated tokens before they are stored. For example, all alphabetic characters may be converted to lower case, and/or punctuation characters (e.g., commas and "at symbols") removed. Token filtering 540, like tokenizers 530, may be guided by one or more rules in the disclosed set of rules.

It is noted that the example of FIG. 6 is merely for demonstrative purposes. Other embodiments may include different elements or elements may be arranged in a different order. For example, tokenizers 530 are shown as operating before token filtering 540. In other embodiments, token filtering 540 may be performed prior to tokenizers 530. Although four tokenizers are shown, any suitable number of tokenizers may be included to support any suitable type of search string functions.

FIGS. 1-6 describe the disclosed search operations as performed by a computer system that manages the search operations. Proceeding to FIG. 7, two depictions of an interface that may be utilized by a requestor of a search query are shown. Search interface 701 illustrates an example of an interface a requestor may use to generate a particular search query. Search results 720 provides an example of how results of a search query may be presented to the requestor.

Search interface 701, as shown, presents four input boxes for a user to create a given search query. Search record 710 includes a pull-down menu to select one of a set of record types to be searched. As previously disclosed, record types may include any suitable set of user profiles, account update activity, an account login event, a transaction event, and the like. Search field 712 may allow the requestor to limit a search to a particular field within the searched records, such as usernames, email addresses, mailing addresses, record identification values, and so forth. Like search record 710, search field 712 may be implemented as a pull-down menu. Search type 714 allows the requestor to select one of a set of search functions, such as one of search string functions 140. Such functions may include an "equals" search, "starts-with" search, "ends-with" search, "contains" search, and the like. Search term 716 is shown as a text box that enables the requestor to enter a string value that will be compared to one or more tokens such as may be stored in database 212 in FIGS. 2-3.

In various embodiments, some of the input boxes may be optional. For example, the requestor may omit selections for search record and search field, and select only a search type and search term. Once the requestor has completed the desired input boxes, the search query may be initiated by selecting the begin search 718 button. As shown, the requested search query may limit searches to an address field in transaction type records only. The search operation is a "contains" search string function that looks for the term "Oregon" in the selected record and field. In a similar manner as the tokens in some embodiments, the search term 716 may also be filtered to convert capital letters to lower case and/or to remove punctuation. The search may be performed using any of the previously described techniques.

As illustrated, search results 720 depicts an example of how results from the initiated search may be displayed for the requestor to see. When the search is performed, one or more results may be determined, matched records accessed from database 110, and then at least a portion of data strings included in the accessed records are displayed in a table in the search results 720 screen. In some embodiments, an individual record may be displayed after it has been matched to the search criteria. In other embodiments, records may be displayed, one screen at a time, after all records have been matched and the traversing of the stored token sets is complete.

The data strings that are displayed may be predetermined, or selectable by the requestor. As shown, four data strings are displayed for each matching record, including record identification (ID) 721, transaction ID 723, username 725, and address 727. In some embodiments, one or more of the displayed data strings may be determined based on the search query. For example, in the illustrated example, transaction ID 723 and address 727 columns may be displayed due to the requestor's selections for search record 710 and search field 712.

It is noted that the examples shown in FIG. 7 are used to demonstrate disclosed concepts. Variations of the examples are contemplated. For example, the search interface may include any suitable number of input boxes, including for example, a single box in which a requestor types all search criteria. As stated, the search results may, in various embodiments, display any suitable amount of data from a matched record, including for example, displaying only a record ID for the matched records. The search interface and search results may be displayed on a same computer system that is performing the search operation, a computer system being used by the requestor, and/or other computer systems, such as a computer used by a system administrator. In embodiments, the search interface and the search results may be displayed on different computer systems.

FIGS. 1-7 describe various aspects of managing and performing search operations on a database. Such operations may be implemented using a variety of methods. FIGS. 8-10 describe several such methods.

Proceeding now to FIG. 8, a flow diagram of an embodiment of a method for performing a search of a database is depicted. In various embodiments, method 800 may be performed by computer system 101 in FIG. 1B to preprocess records 115 in database 110, and then perform search query 145. For example, computer system 101 may include (or have access to) a non-transitory, computer-readable medium having program instructions stored thereon that are executable by the computer system to cause the operations described with reference to FIG. 8.

At block 810, method 800 includes preprocessing, by computer system 101, records 115 of database 110 to create token sets 133a-133d for record 115a. In various embodiments, records 115 may be preprocessed by computer system 101 in response to an initial installation of search features on computer system 101 and/or when a new record is added to database 110. A respective one of token sets 133 may correspond to ones of a plurality of search string functions 140. Ones of token sets 133 include one or more possible substrings 135 located within data strings 117 of record 115a. For example, record 115a includes data strings 117a and 117b. Token sets 133 may be generated for data string 117a while a second plurality of token sets is generated for data string 117b. Substrings 135 correspond to at least a portion of the characters included in data string 117a, wherein at least some of substrings 135 include different portions from the other substrings. For example, substrings 135b-135d within token set 133b may be different from one another, but a given one (e.g., substring 135d) may represent a same portion of data string 117a as substring 135a and/or a substring in one or both of token sets 133c and 133d.

Method 800 further includes, at block 820, receiving search query 145 for a search of database 110. Search query 145 may include at least one of the plurality of search string functions 140. A requestor, using computer system 101 or a different computer coupled to computer system 101 through a network, to generate and initiate search query 145 to identify one or more of records 115 based on a set of search criteria. The search criteria may include one or more of a set of supported search string functions 140 as previously described. In addition, search query 145 includes at least one search string to be compared to data strings in records 115 of database 110.

Method 800 at block 830 includes performing search query 145 by traversing, using at least a portion of records 115, at least one token set corresponding to the included search string functions 140. As illustrated, computer system 101 performs search query 145 by comparing the included search string to ones of the substrings included in at least one of the token sets, rather than comparing the search string to data strings in records 115. As described above, each token set may correspond to one respective search string function 140. Only token sets corresponding to the search string function(s) in search query 145 may be used in the performance of search query 145. As shown in FIG. 1B, search query 145 includes search string function 140c. Accordingly, to determine if record 115a satisfies the criteria of search query 145, computer system 101 only compares the included search string to token set 133c. Token sets 133a, 133b, and 133d may not be accessed for search query 145. In addition, record 115a may not be accessed for search query 145 unless one of substrings 135e or 135f matches the included search string. Others of records 115 may be searched using their respective token sets that correspond to search string function 140c.

Block 840 of method 800 includes returning results for the search based on the query and the traversing. If any searched records 115 satisfy the criteria of search query 145, then an identifier for the matching record may be added to results 150. As previously described, the record identifier and, in some embodiments, at least a portion of data strings of the matching record may be displayed for the requestor to see. In some embodiments, search query 145 may be part of an automated process and instead of displaying information related to matching records, the information is placed into a file and stored and/or utilized by the automated process. The method may end in block 840. In some embodiments, at least a portion of method 800 may be repeated, for example, returning to block 820 in response to receiving another search query.

It is noted that the method of FIG. 8 includes elements 810-840. In some cases, method 800 may be performed concurrently with other instantiations of the method. For example, two or more cores, or process threads in a single core, in computer system 101 may each perform method 800 independently from one another. Although four blocks are shown for method 800, additional blocks may also be included in other embodiments. For example, an additional block may include retrieving a matching record from database 110 after a match has been determined.

Moving to FIG. 9, a flow diagram of an embodiment of a method for preprocessing a new record added to a database is depicted. Method 900 may be performed by client computer system 101, as shown in FIG. 2, to generate a plurality of token sets including token sets 233. Client computer system 101 may, for example, include (or have access to) a non-transitory, computer-readable medium having program instructions stored thereon that are executable by the computer system to cause the operations described with reference to FIG. 9.

Block 910 of method 900 includes, in response to determining that new record 215, including data string 217, has been added to database 110 that includes a plurality of records, retrieving new record 215 from database 110. As new records are added to database 110, computer system 101 may preprocess the new records as they are added, or may preprocess new records at predetermined points in time, such as a time of day when usage of database 110 is typically low. Messages may be generated in conjunction with an addition of a new record in database 110. For example, a message system (e.g., Kafka) may be used to generate a notification to one or more computers that the new record has been added. Computer system 101 may receive such messages and use them to determine when new records have been added to database 110. At a particular point in time, computer system 101 retrieves appropriate new records, including new record 215, to preprocess the new records for inclusion in search operations performed by computer system 101.

At block 920, method 900 includes mapping new record 215 to a respective one of a set of record types 225. As previously described, records stored in database 110 may include records of various types. As shown, new records may correspond to one of record types 225. Using information included in data string 217 and any other suitable information in new record 215, computer system 101 determines that new record 215 correspond to record type 225c. For example, the word "security" found in data string 217 may be indicative of a user login event which, in turn, may correspond to record type 225c.

Method 900 also includes, at block 930, based on the mapped record type 225c, generating one or more substrings for data string 217. As disclosed, computer system 101 may include or have access to a set of rules for preprocessing records. These rules may set guidelines for which data strings are used to generate respective token sets and how tokens are generated for each token set. Using such rules, computer system 101 may generate token sets 233 from data string 217. Each token set 233 may correspond to a particular one of a set of search string functions. Accordingly, the generated substrings, also referred to as tokens, for a given token set 233 may correspond to a particular portion of data string 217 associated with the particular search function for the given token set 233. For example, token set 233c may be associated with an "ends-with" search string function, and therefore, tokens 236 in token set 233c correspond to various portions of data string 217 that all include the last characters of data string 217, e.g., tokens 236 all include at least the last four letters, "rity," that the string "security" ends with.

In addition, method 900 includes, at block 940, storing the generated substrings into token sets 233 that correspond to ones of a plurality of search string functions. As disclosed, the substrings are generated based on ones of a set of supported search string functions. The generated substrings are placed, as tokens, with in the corresponding token set 233. In various embodiments, computer system 101 stores token sets 233 locally, in a storage device within computer system 101 or in a separate storage device that is accessible to computer system 101, such as in database 212. As has been described, generated token sets may be stored separately from database 110 in order to decrease an amount of bandwidth consumed from database 110 operation when performing search queries. The separation may allow searches to be performed on the token sets rather than on the records in database 110. The method may end in block 940.

It is noted that the method of FIG. 9 includes elements 910-940. Method 900 may be repeated in response to a determination that additional new records have been added to the database. In a similar manner as method 800, different instances of method 900 may be performed by one or more processor cores in the computer system to process multiple new records concurrently. Although four blocks are shown for method 900, additional blocks may also be included in other embodiments. For example, an additional block may include filtering data strings and/or substrings before and/or after generating the token sets.

Turning to FIG. 10, a flow diagram of an embodiment of a method for performing a search of a database using token sets is shown. Method 1000 may be performed by computer system 101 in FIG. 3 to perform search query 145 using at least token sets 233. Computer system 101 may, for example, include (or have access to) a non-transitory, computer-readable medium having program instructions stored thereon that are executable by the computer system to cause the operations described with reference to FIG. 10.

At block 1010, method 1000 includes receiving, by computer system 101, search query 145 for a search of database 110 with a plurality of records, including new record 215. Search query 145 includes one or more of a plurality of search string functions 140, as well as a search string for use with the included search string functions. As disclosed herein, search string functions 140 may include "equals," "starts-with," "ends-with," and "contains" functions. Other functions, including for example, use of wildcards in the search string, may be implemented in other embodiments. Computer system 101 may receive search query 145 from a requestor using computer system 101 or from a different computer coupled via a network connection to computer system 101.

Method 1000 at block 1020 also includes selecting, based on the one or more included search string functions 140, a subset of a plurality of token sets. As described above, a given token set includes one or more substrings found within a data string included in a given record in database 110. In addition, each token set of the plurality may be associated with a given one of search string functions 140. For example, token set 233d includes substrings (e.g., tokens 237) that are found within the data string 217 of new record 215. Token set 233d is further associated with search string function 140d, which in this example, corresponds to a "contains" function.

At block 1030, method 1000 also includes traversing, by computer system 101 using a search term included in search query 145, the subset of token sets. Based on an inclusion of search string function 140d in search query 145, computer system 101 may select a subset of token sets associated with search string function 140d, including token set 233d. Using the search string included in search query 145, "urit," computer system 101 traverses the subset of token sets, comparing the search string with one or more of the tokens in each of the subset of token sets. For example, when traversing token set 233d, computer system 101 may compare the search string to each of tokens 237a-237d. As shown, token 237d matches the search string, "urit." Computer system 101, may therefore, end the traversing since new record 215, corresponding to token set 233d, has already satisfied the search criteria. Computer system 101 may further add an identifier for new record 215 to results 150.

Method 1000, at block 1040, further includes returning results 150 for search query 145 based on the traversing. Computer system 101 may provide results 150 to the requestor who initiated search query 145. As disclosed above, returning results may include displaying a list of records that satisfy the search criteria, and/or providing a file that includes this list. The list may include any suitable amount of information associated with the matching records, from a simple identifier per matching record, to inclusion of some or all of the data strings included in the matching records. Method 1000 may end in block 1040.

The method of FIG. 10, it is noted, includes elements 1010-1040. Method 1000 may be repeated in response to receiving another search query. In a like manner as methods 800 and 900, different instances of method 1000 may be performed concurrently by one or more processor cores in computer system 101 in response to multiple search queries being received. Although four blocks are shown for method 1000, in other embodiments, additional blocks may be included, such as an operation that extracts and filters the search string from the search query before comparing the search string to any tokens.

Figure 11:
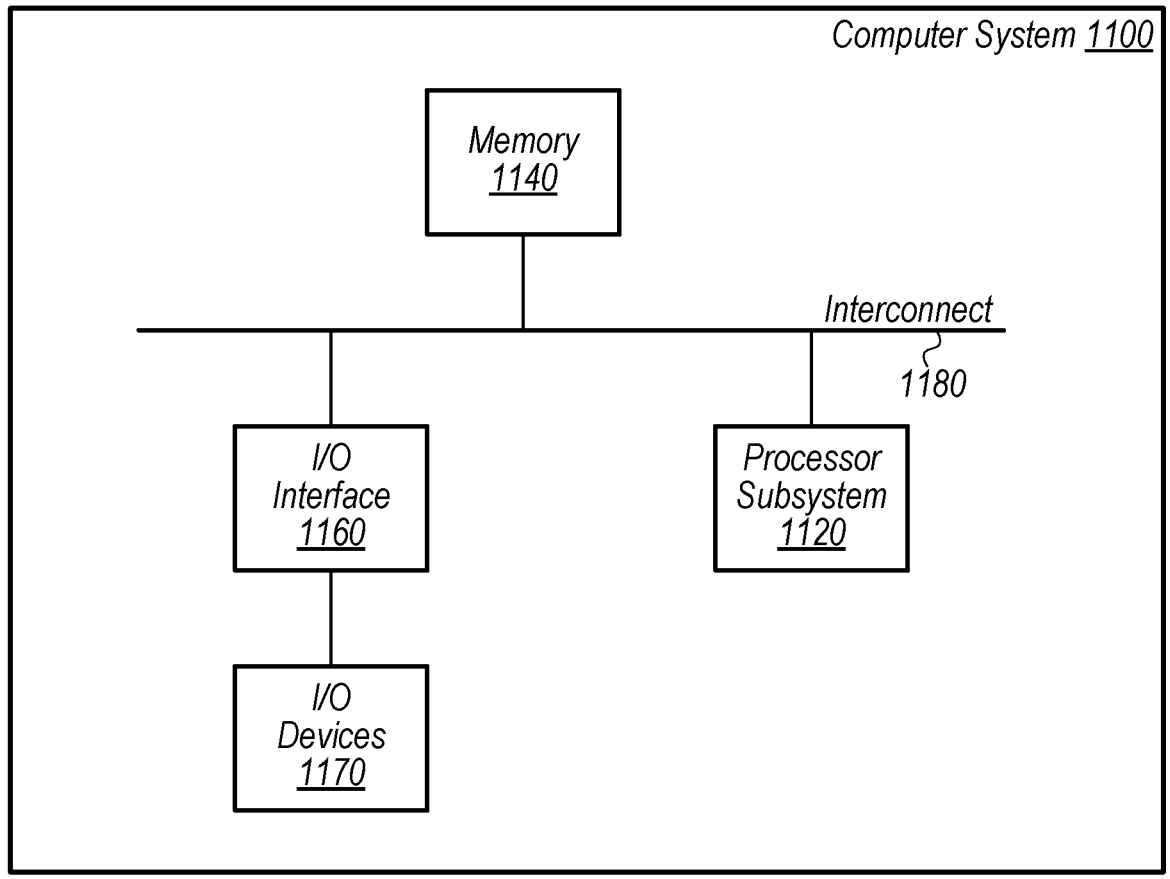
FIG. 11 is a block diagram illustrating an example computer system, according to some embodiments.

Referring now to FIG. 11, a block diagram of an example computer system 1100 is depicted. Computer system 1100 may, in various embodiments, implement one or more of the disclosed computer systems, such as computer system 101 FIGS. 1-3 as well as a portion or all of databases such as 110 and 212 in FIGS. 1-3. Computer system 1100 includes a processor subsystem 1120 that is coupled to a system memory 1140 and I/O interfaces(s) 1160 via an interconnect 1180 (e.g., a system bus). I/O interface(s) 1160 is coupled to one or more I/O devices 1170. Computer system 1100 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 1100 is shown in FIG. 11 for convenience, computer system 1100 may also be implemented as two or more computer systems operating together.

Processor subsystem 1120 may include one or more processors or processing units. In various embodiments of computer system 1100, multiple instances of processor subsystem 1120 may be coupled to interconnect 1180. In various embodiments, processor subsystem 1120 (or each processor unit within 1120) may contain a cache or other form of on-board memory.

System memory 1140 is usable to store program instructions executable by processor subsystem 1120 to cause computer system 1100 perform various operations described herein. System memory 1140 may be implemented using different physical, non-transitory memory media, such as hard disk storage, floppy disk storage, removable disk storage, flash memory, random access memory (RAM—SRAM, EDO RAM, SDRAM, DDR SDRAM, LPDDR SDRAM, etc.), read-only memory (PROM, EEPROM, etc.), and so on. Memory in computer system 1100 is not limited to primary storage such as system memory 1140. Rather, computer system 1100 may also include other forms of storage such as cache memory in processor subsystem 1120 and secondary storage on I/O devices 1170 (e.g., a hard drive, storage array, etc.). In some embodiments, these other forms of storage may also store program instructions executable by processor subsystem 1120.

I/O interfaces 1160 may be any of various types of interfaces configured to couple to and communicate with other devices, according to various embodiments. In one embodiment, I/O interface 1160 is a bridge chip (e.g., Southbridge) from a front-side to one or more back-side buses. I/O interfaces 1160 may be coupled to one or more I/O devices 1170 via one or more corresponding buses or other interfaces. Examples of I/O devices 1170 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1170 includes a network interface device (e.g., configured to communicate over WiFi, Bluetooth, Ethernet, etc.), and computer system 1100 is coupled to a network via the network interface device.

\* \* \*

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

* * *

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

* * *

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a. plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method comprising:
   preprocessing, by a computer system, records of a database to create one or more token sets for a given record, wherein the created token sets correspond to ones of a plurality of search string functions, and include token sets that include a plurality of possible substrings located within data strings of a corresponding database record;
   receiving, by the computer system, a query for a search of the database, wherein the query includes at least one of the plurality of search string functions;
   performing the search by traversing, by the computer system using at least a portion of the records, at least one token set corresponding to the included search string functions; and
   returning, by the computer system, results for the search based on the query and the traversing.

2. The method of claim 1, wherein traversing the at least one token set includes comparing, by the computer system, a search term included in the query to one or more of the possible substrings in the at least one token set.

3. The method of claim 1, wherein creating the plurality of possible substrings includes:
   generating, by the computer system, a first substring using a predetermined minimum number of consecutive characters located within a corresponding data string; and
   generating, by the computer system, a second substring using a predetermined maximum number of consecutive characters located within the corresponding data string.

4. The method of claim 1, wherein preprocessing the records of the database includes mapping, by the computer system, the given record to respective ones of a set of record types.

5. The method of claim 4, wherein a number of token sets that are generated for a particular data string of a particular record is determined based on the mapped record type of the particular record.

6. The method of claim 1, wherein the database is located in a first storage device, and further comprising storing the created token sets on a second storage device different from the first storage device.

7. The method of claim 1, wherein the preprocessing includes, prior to creating the one or more token sets, filtering, by the computer system, control tags from data strings in the given record.

8. The method of claim 1, wherein the preprocessing includes, after creating a given token of a particular token set of the given record, converting, by the computer system, uppercase characters to lowercase characters in the given token.

9. The method of claim 1, wherein a particular token set corresponds to a search string function that matches characters at the end of a data string to a search term included in the query.

10. A non-transitory computer-readable medium having instructions stored thereon that are executable by a computer system to perform operations comprising:
    in response to determining that a new record, including a set of data strings, has been added to a database that includes a plurality of records, retrieving the new record from the database;
    mapping the new record to a respective one of a set of record types;
    based on the mapped record type, generating one or more substrings for ones of the set of data strings;
    storing the generated substrings into one or more token sets that correspond to ones of a plurality of search string functions;
    in response to receiving a search query that includes one of the plurality of search string functions, performing a search of at least a portion of the plurality of records, based on a particular one of the one or more token sets, the particular token set corresponding to the included search string function; and
    returning results for the search based on the search query.

11. The non-transitory computer-readable medium of claim 10, wherein performing the search includes comparing a search term included in the search query to one or more of the substrings in the particular token set.

12. The non-transitory computer-readable medium of claim 10, wherein the generating includes, based on the mapping, excluding substrings for one or more data strings of the set of data strings from the token sets.

13. The non-transitory computer-readable medium of claim 10, wherein the generating includes, based on a given field of the respective record type of the new record, excluding, from the token sets, at least one of the one or more substrings of a data string in the given field.

14. The non-transitory computer-readable medium of claim 10, wherein a particular one of the one or more token sets corresponds to a search string function that matches characters at the beginning of a data string to a search term included in the search query.

15. The non-transitory computer-readable medium of claim 10, further comprising, after generating a given token of a particular token set for the new record, converting uppercase characters in the given token to lowercase characters.

16. A method comprising:
    receiving, by a computer system, a query for a search of a database with a plurality of records, wherein the query includes one or more of a plurality of search string functions;
    selecting, by the computer system based on the one or more included search string functions, a subset of a plurality of token sets, wherein a given token set includes one or more substrings found within a data string included in a given record in the database;

traversing, by the computer system using a search term included in the query, the subset of token sets; and returning, by the computer system, results for the search based on the traversing.

17. The method of claim 16, wherein ones of the plurality of token sets correspond to respective ones of the plurality of search string functions.

18. The method of claim 16, wherein the selecting includes, in response to determining that the one or more included search string functions includes a contains function, selecting a particular token set corresponding to a search string function that matches a sequence of characters anywhere within a data string to the search term.

19. The method of claim 16, wherein the traversing includes:

comparing the search term to one or more of the substrings in the subset of token sets; and in response to the search term matching a given one of the one or more substrings, adding a corresponding record of the plurality of records to the results.

20. The method of claim 19, wherein the returning includes:

accessing, from the database, records that were added to the results, wherein records of the plurality of records that were not added to the results are not accessed in response to the query; and displaying at least a portion of data strings included in the accessed records on a display of a computer.

* * * * *